(12) United States Patent
Ayyapureddi

(10) Patent No.: US 12,451,211 B2
(45) Date of Patent: Oct. 21, 2025

(54) ACCESS LINE CONTACTS FOR AN ACCESS LINE IN A MEMORY DEVICE

(71) Applicant: Micron Technology, Inc., Boise, ID (US)

(72) Inventor: Sujeet Ayyapureddi, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 179 days.

(21) Appl. No.: 18/505,532

(22) Filed: Nov. 9, 2023

(65) Prior Publication Data

US 2024/0274220 A1 Aug. 15, 2024

Related U.S. Application Data

(60) Provisional application No. 63/445,381, filed on Feb. 14, 2023.

(51) Int. Cl.
*G11C 29/52* (2006.01)
*G11C 5/02* (2006.01)

(52) U.S. Cl.
CPC ............. *G11C 29/52* (2013.01); *G11C 5/02* (2013.01)

(58) Field of Classification Search
CPC .. G11C 29/52; G11C 5/02; G11C 8/14; G11C 5/063; G11C 8/08; G11C 5/025; G11C 2029/0411

USPC ................................................... 365/185.09
See application file for complete search history.

(56) References Cited

U.S. PATENT DOCUMENTS

| 10,541,029 B2* | 1/2020 | Feeley ............... G11C 16/10 |
| 10,892,004 B2 | 1/2021 | Jeong |
| 2014/0063888 A1* | 3/2014 | Lee ................ G11C 11/1653 365/163 |
| 2025/0078883 A1* | 3/2025 | Rawat ................ G06N 3/063 |

FOREIGN PATENT DOCUMENTS

WO   WO-2014036243 A1 *  3/2014   ......... G11C 11/1653

* cited by examiner

*Primary Examiner* — Fernando Hidalgo
(74) *Attorney, Agent, or Firm* — Brooks, Cameron & Huebsch, PLLC

(57) ABSTRACT

Systems, methods, and apparatuses related to determining a number of access line contacts for an access line in a memory device are described. An apparatus includes a first data plane, a second data plane, and a sub-access line driver (SAD), all coupled to a local access line. A first portion of the local access line between the SAD and the first data plane includes a first number of access line contacts, a second portion of the local access line between the SAD and the second data plane includes a second number of access line contacts, and the first number of access line contacts are determined by data corresponding to a first function of the first data plane and the second number of access line contacts are determined by data corresponding to a second function of the data plane.

20 Claims, 5 Drawing Sheets

ACCESS LINE CONTACTS FOR AN ACCESS LINE IN A MEMORY DEVICE

PRIORITY INFORMATION

This application claims the benefit of U.S. Provisional Application No. 63/445,381, filed on Feb. 14, 2023, the contents of which are incorporated herein by reference.

TECHNICAL FIELD

The present disclosure relates generally to memory devices, and more particularly, to access line contacts for an access line in a memory device.

BACKGROUND

Memory is often implemented in electronic systems, such as computers, cell phones, hand-held devices, etc. There are many different types of memory, including volatile and non-volatile memory. Volatile memory may require power to maintain its data and may include random-access memory (RAM), dynamic random-access memory (DRAM), static random-access memory (SRAM), and synchronous dynamic random-access memory (SDRAM). Non-volatile memory may provide persistent data by retaining stored data when not powered and may include NAND flash memory, NOR flash memory, nitride read only memory (NROM), phase-change memory (e.g., phase-change random access memory), resistive memory (e.g., resistive random-access memory), cross-point memory, ferroelectric random-access memory (FeRAM), or the like.

An access line can be a global access line, a local access line, or a memory cell access line. As used herein, the term "global access line" refers to an access line that provides a current to a sub access line driver (SAD) coupled to a local access line. As used herein, the term "local access line" refers to an access line that provides current to a memory cell access line. As used herein, the term, "memory cell access line" refers to an access line that provides current to memory cells that are coupled to the memory cell access line. A memory cell access line can be coupled to the local access line via an access line contact on the local access line. The local access line can include an access line driver (e.g., sub access line driver (SAD)). As used herein, the term "access line driver" refers to circuitry configured to supply current to a memory cell access line in response to receiving a signal indicating an address for data corresponding to a request.

DETAILED DESCRIPTION

Figure 1:
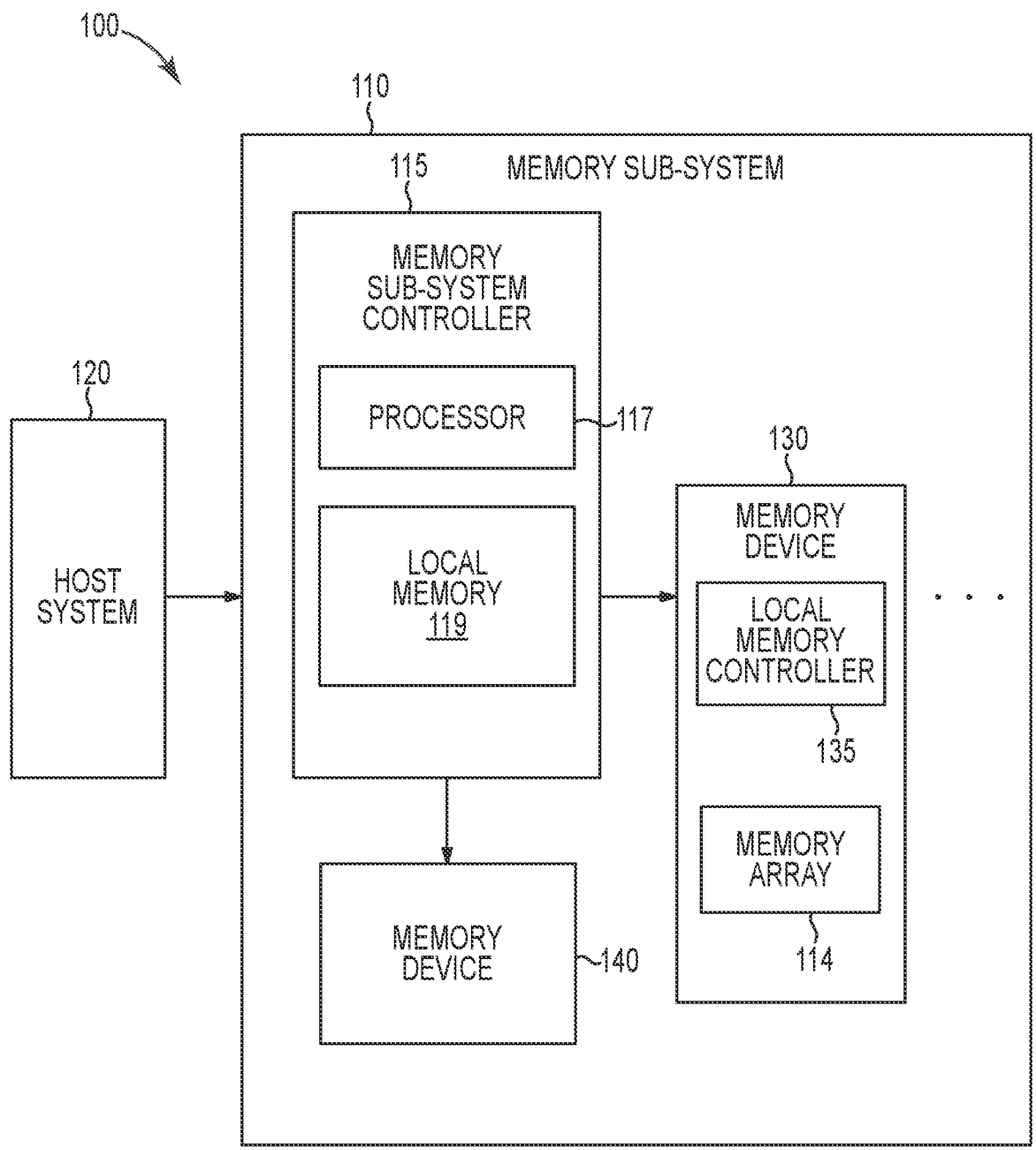
FIG. 1 illustrates an example computing system that includes a memory sub-system in accordance with a number of embodiments of the present disclosure.

Embodiments of the present disclosure describe determining a number of access line contacts for an access line in a memory device. An embodiment includes an array of memory cells including a first data plane, a local access line coupled to the first data plane, a second data plane, an access line driver (e.g., a sub-access line driver (SAD)) coupled to the local access line and a global access line coupled to the SAD. The first portion of the local access line between the SAD and the first data plane includes a first number of access line contacts, a second portion of the local access line between the SAD and the second data plane includes a second number of access line contacts, and the first number of access line contacts are determined by data corresponding to a first function of the first data plane and the second number of access line contacts are determined by data corresponding to a second function of the second data plane.

An SAD can drive current through a local access line and that current can travel through an access line (e.g., memory cell access line) coupled to the local access line. A memory cell access line can be coupled to the local access line via an access line contact formed on the local access line.

If an access line contact is defective, the operation of the memory device can be negatively affected. The negative effects can include data bits having an unintended value (e.g., having a value of 1 when the intended value is 0) and a failure of the SAD. This can lead to, among other issues, incorrect data reads. A processor on or coupled to the memory device can include error correction code (ECC) circuitry to correct the errors. However, if the number of errors exceeds the ability of the ECC circuitry to correct the errors, the errors can become uncorrectable errors (UE) and cause the memory device to function improperly.

Embodiments of the present disclosure, however, can compensate for a defective access line contact, such that the memory device can function as intended even when at least one access line contact is defective. For example, embodiments of the present disclosure can add an additional access line contact to decrease an amount of errors in the data input into, or received from, a word line. The decrease in the amount of errors in the data is achieved by coupling a single memory cell access line to a local access line via multiple access line contacts. Coupling a single memory cell access line to a local access line via multiple access line contacts allows a second access line contact to be used to input data into, or receive data from, the access line if the first access line is defective. This decreases an amount of errors in the data because, in some embodiments, multiple access line contacts would need to be defective for the errors to affect the operation of the memory device instead of just one access line contact being defective.

The figures herein follow a numbering convention in which the first digit or digits correspond to the figure number of the drawing and the remaining digits identify an element or component in the drawing. Similar elements or components between different figures may be identified by the use of similar digits. For example, reference numeral 326 may reference element "26" in FIG. 3, and a similar element may be referenced as 426 in FIG. 4. Analogous elements within one figure may be referenced with a reference numeral followed by a hyphen and another numeral or a letter. For example, 207-1 may reference element 207-1 in FIGS. 2 and 207-2 may reference element 207-2, which may be analogous to element 203-1. Such analogous elements may be generally referenced without the hyphen and extra numeral or letter. For example, elements 207-1, 207-2, and 207-N or other analogous elements may be generally referenced as 207.

FIG. 1 illustrates an example computing system 100 that includes a memory sub-system 110 in accordance with some embodiments of the present disclosure. The memory sub-system 110 can include media, such as one or more volatile memory devices (e.g., memory device 130), one or more non-volatile memory devices (e.g., memory device 140), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, the term "coupled to" or "coupled with" can refer to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via an interface (e.g., a physical host interface). Examples of an interface can include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), Universal Serial Bus (USB), or any other interface. The interface can be used to transmit data between the host system 120 and the memory sub-system 110. The interface can provide a way for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of volatile memory devices and/or non-volatile memory devices. The volatile memory devices can be, but are not limited to, random access memory (RAM), such as dynamic random access memory (DRAM) and synchronous dynamic random access memory (SDRAM).

Each of the memory devices 130, 140 can include one or more arrays of memory cells. One type of memory cell, for example, single level cells (SLC) can store one bit per cell. Other types of memory cells, such as multi-level cells (MHLCs), triple level cells (TLCs), quad-level cells (QLCs), and penta-level cells (PLCs) can store multiple bits per cell. In some embodiments, each of the memory devices 130, 140 can include one or more arrays of memory cells such as SLCs, MLCs, TLCs, QLCs, or any combination of such. In some embodiments, a particular memory device 130, 140 can include an SLC portion, and an MLC portion, a TLC portion, a QLC portion, or a PLC portion of memory cells. The memory cells of the memory devices 130, 140 can be grouped as pages that can refer to a logical unit of the memory device 130, 140 used to store data.

A memory sub-system controller 115 (or controller 115 for simplicity) can communicate with the memory devices 130, 140 to perform operations such as reading data, writing data, or erasing data at the memory devices 130, 140 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140.

The memory sub-system controller 115 can be responsible for other operations such as wear leveling operations, garbage collection operations, error detection and ECC operations, encryption operations, caching operations, and address translations between a logical address (e.g., logical block address (LBA), namespace) and a physical address (e.g., physical block address) that are associated with the memory devices 130, 140. The memory sub-system controller 115 can further include host interface (not pictured) circuitry to communicate with the host system 120 via a physical host interface (not pictured). The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package.

In some embodiments, the memory array (e.g., array of memory cells) 114 can include an ECC plane (e.g., ECC plane 326 in FIG. 3) coupled to a first column plane (e.g., column plane 324 in FIG. 3) via a first local access line (e.g., local access line 446 in FIG. 4), a second column plane coupled to the ECC plane via a second local access line, a first sub-access line driver (SAD) coupled to the first local access line, and a second SAD coupled to the second local access line. The memory array 114 can further include a first number of access line contacts (e.g., access line contacts 450 in FIG. 4) on a first portion of the first local access line between the first column plane and the first SAD and a second number of access line contacts on a second portion of the first local access line between the first SAD and the ECC plane. The first number of access line contacts can be on a first portion of the second local access line between the column data plane and the second SAD and the second number of access line contacts can be on a second portion of the second local access line between the second SAD and the ECC plane. In some embodiments, the first number of access line contacts can be determined by data corresponding to a first function of the first column plane, and the second number of access line contacts can be determined by data corresponding to a second function of the ECC plane.

Figure 2:
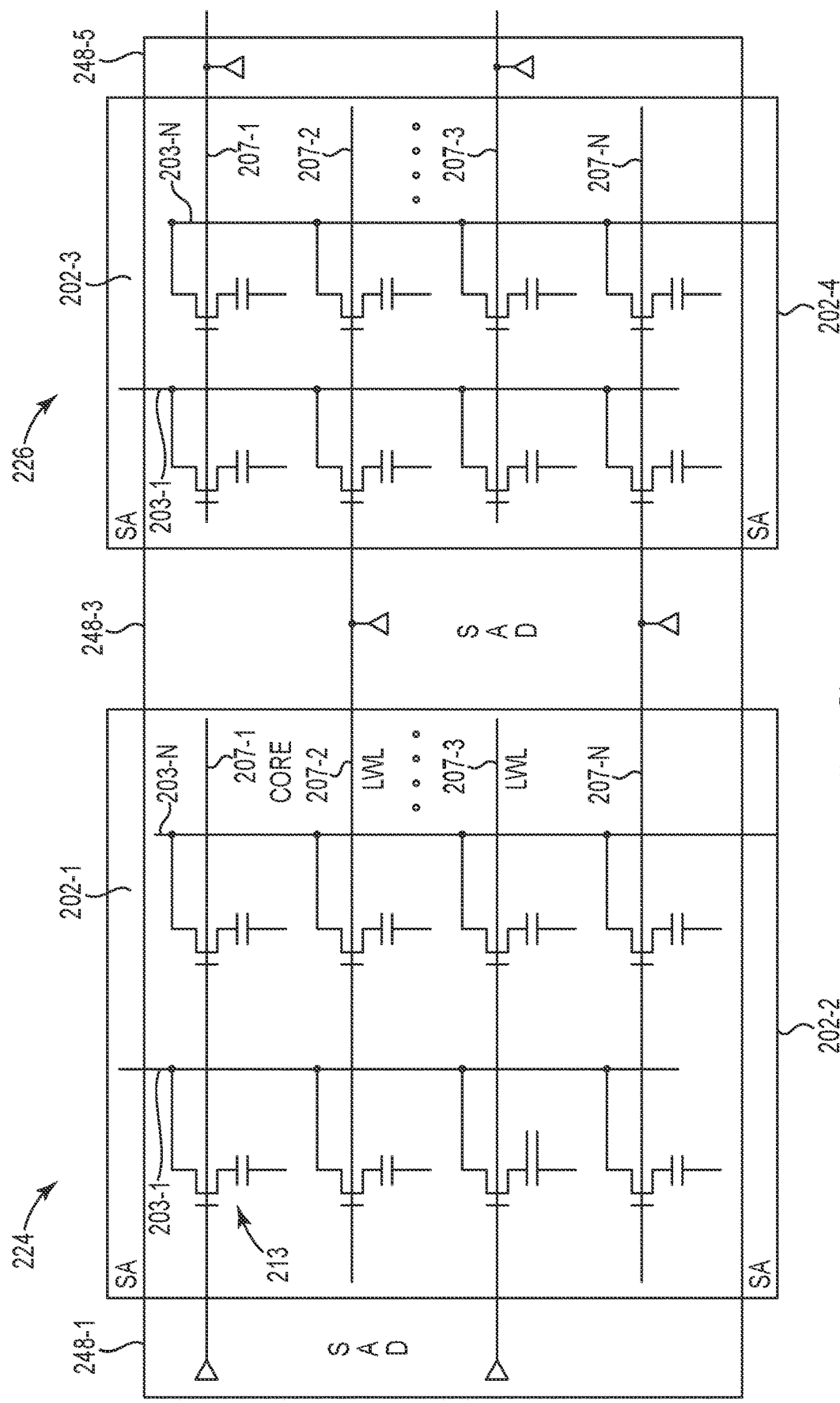
FIG. 2 is a schematic illustration of memory cells in a memory device in accordance with a number of embodiments of the present disclosure.

FIG. 2 is a schematic illustration of memory cells in a memory device in accordance with a number of embodiments of the present disclosure. FIG. 2 includes a plurality of SADs 248-1, 248-3, 248-5 (individually or collectively referred to as SADs 248), an ECC core 226 a data core 224, and sense amplifiers (sense amps, "SA"s) 202-1, 202-2, 202-3, 202-4 (individually or collectively referred to as sense amps 202). The ECC core 226 and the data core 224 can each include memory cells 213, sense lines 203-1, . . . , 203-N (individually or collectively referred to as sense lines 203), and local access lines 207-1, 207-2, 207-3, . . . , 207-N (individually or collectively referred to as local access lines 207).

A global access line (e.g., global access line 436 in FIG. 4) can be coupled to the SAD 248 to drive current to the SAD 248. The SAD 248 in turn can then drive current through the local access lines 207 coupled to the SAD 248. That current can travel to the gates of memory cells 213 coupled to the local access line 207. The selected memory cell 213 can also share charge from its capacitor with the sense line 203. As shown in FIG. 2, sense amps 202 can be coupled to both the top and bottom of each data core 226 and ECC core 224. The sense amps 202 can amplify the voltage across a memory cell 213 such that the value of the charge can be read accurately by sensing circuitry.

Figure 3:
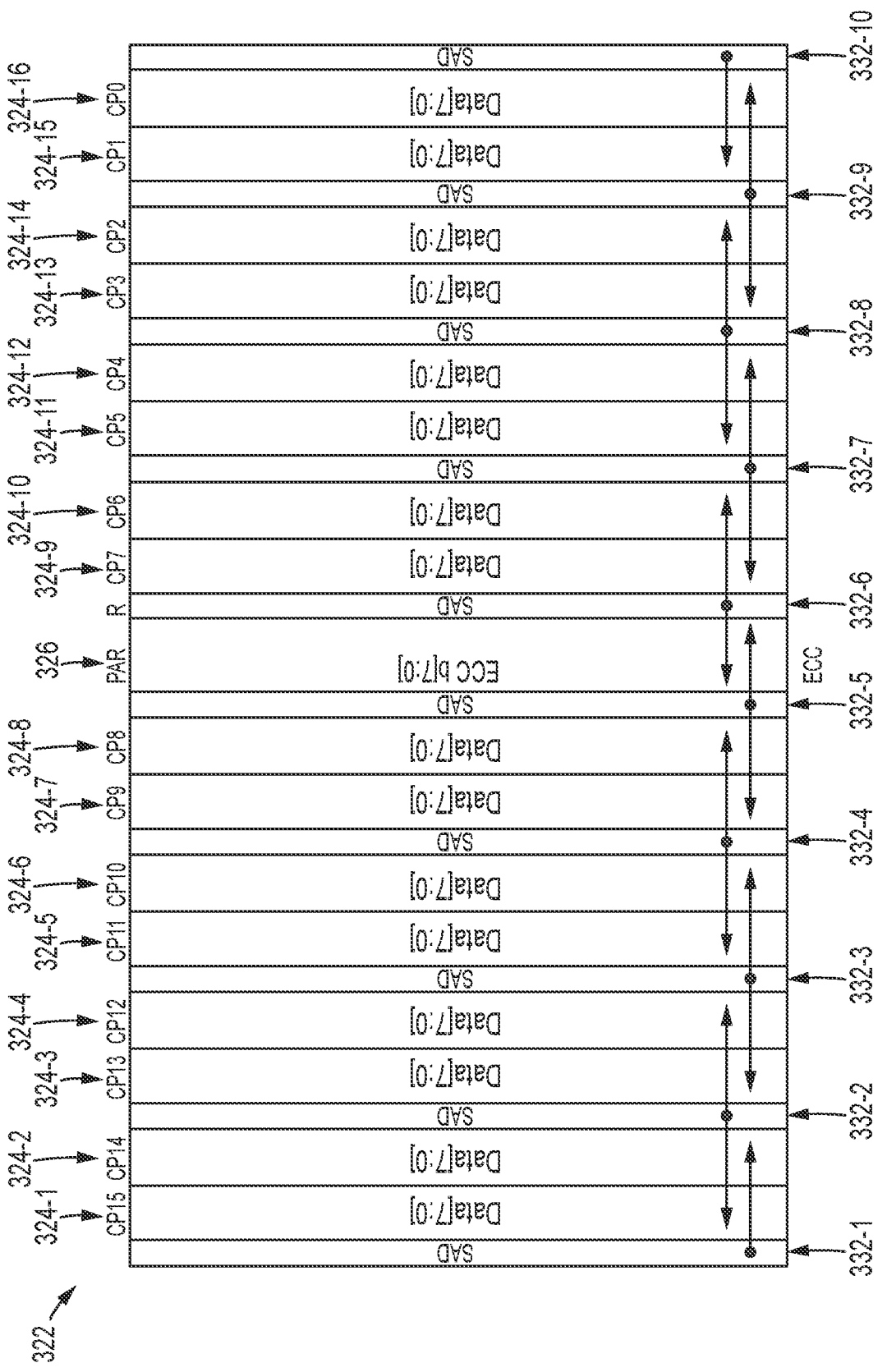
FIG. 3 is a diagram of a plurality of data planes in a memory array of a memory device in accordance with a number of embodiments of the present disclosure.

FIG. 3 is a diagram 322 of a plurality of data planes in a memory array of a memory device in accordance with a number of embodiments of the present disclosure. The diagram 322 includes a plurality of column planes (e.g., data planes) 324-1, 324-2, . . . , 324-16 (individually or collectively referred to as column planes 324), SAD planes (also referred to as sub-access line (SAD) planes) 332-1, 332-2, . . . , 332-10 (individually or collectively referred to as SAD planes 332), and an ECC plane 326. The column planes 324 can be coupled to DQ (input/output) pins (not pictured) to input signals into the column planes 324 and output signals from the column planes 324. Further, the DQ pins can be coupled to sense amplifiers (e.g., sense amps 202 in FIG. 2) at the bottom of the diagram 322 and the top of the diagram 322.

The column planes 324 can correspond to columns of memory cells in an array of memory cells (e.g., memory array 114 in FIG. 1). The ECC plane 326 can include ECC circuitry to correct errors in data stored in the column planes 324. The SAD planes 332 can include SADs (e.g., SADs 448 in FIG. 4) to drive data to the column planes.

Figure 4:
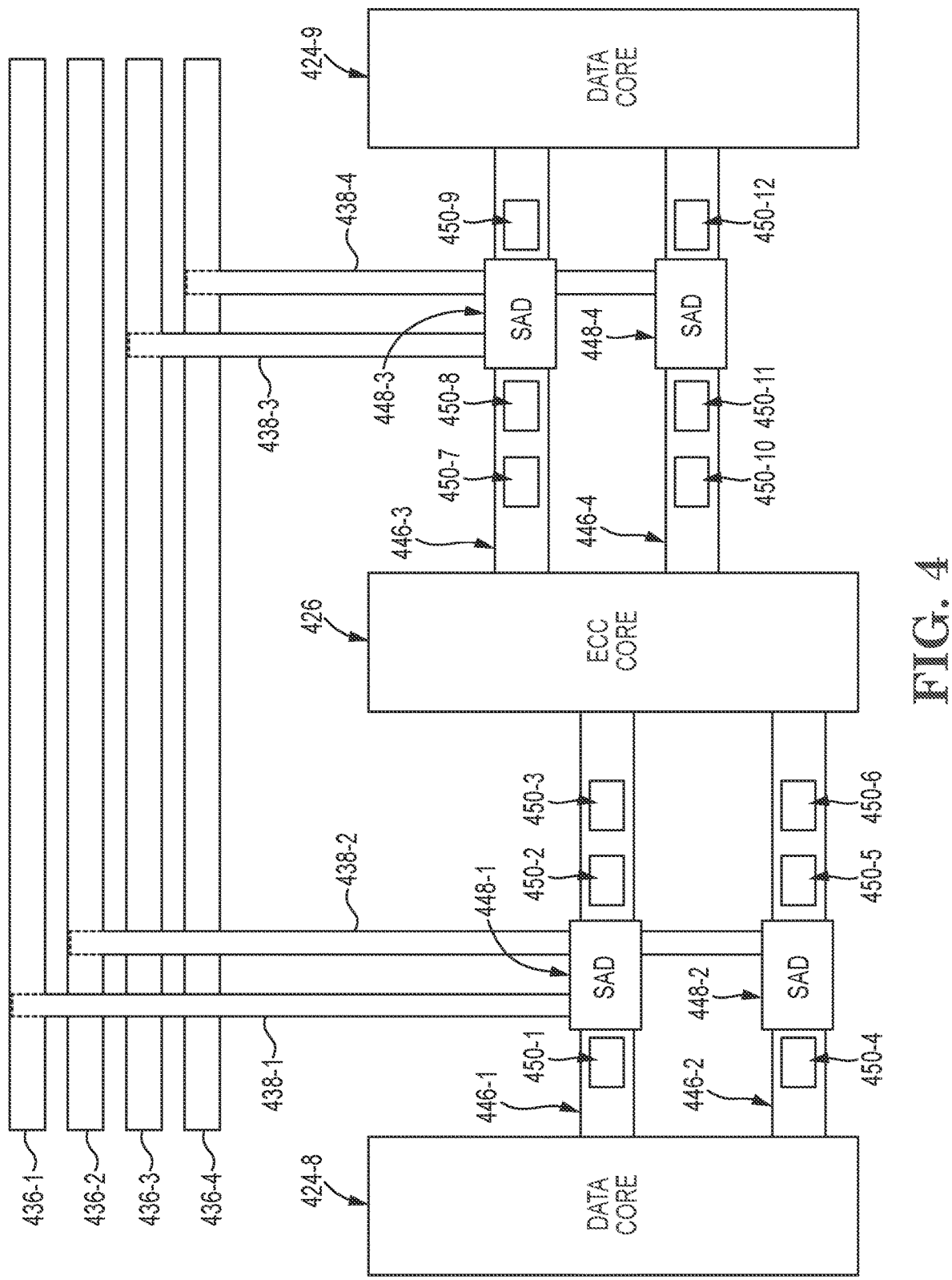
FIG. 4 is a block diagram of a portion of a memory array in accordance with a number of embodiments of the present disclosure.

In some embodiments, the column planes 324 and the ECC plane 326 can be coupled via local access lines (e.g., local access lines 446 in FIG. 4). Memory cell access lines can be coupled to memory cells in a memory array. The SAD in the SAD planes 332 can be coupled to the global access line to drive current through the local access lines. The memory cell access lines can be coupled to the local access lines via access line contacts (e.g., access line contacts 450 in FIG. 4).

In some embodiments, the number of access line contacts used to couple a memory cell access line to the local access line can depend on the function corresponding to the data that corresponds to the access line. For example, the column planes 324 can store data corresponding to a different function than the ECC plane 326. The number of access line contacts used to couple memory cell access lines corresponding to the column planes 324 to the local access line can be different than the number of access line contacts used to couple the memory cell access line corresponding to the ECC plane to the local access line.

FIG. 4 is a block diagram of a portion of a memory array in accordance with a number of embodiments of the present disclosure. FIG. 4 includes a first data core 424-8 and a second data core 424-9, an ECC core 426, global access lines 436-1, 436-2, 436-3, 436-4 (individually or collectively referred to as global access lines 436), local access lines 446-1, 446-2, 446-3, 446-4 (individually or collectively referred to as local access lines 446), access line contacts 450-1, 450-2, . . . , 452-12 (individually or collectively referred to as access line contacts 450), and SADs 448-1, 448-2, 448-3, 448-4 (individually or collectively referred to as SADs 448). The first data core 424-8 corresponds to the data core 324-8 in FIG. 3, the second data core 424-9 corresponds to the data core 324-9 in FIG. 3, and the ECC core 426 corresponds to the ECC core 326 in FIG. 3.

In some embodiments, each global access line 436 can be coupled to a different SAD 448 via a corresponding connector 438. For example, global access line 436-1 can be coupled to SAD 448-1 via connector 438-1, global access line 436-2 can be coupled to SAD 448-2 via connector 438-2, global access line 436-3 can be coupled to SAD 448-3 via connector 438-3, and global access line 436-4 can be coupled to SAD 448-4 via connector 438-4. Each SAD 448 can be coupled to a different local access line 446; therefore, each global access line 436 can be coupled to a different local access line 446. In some embodiments, the global access lines 436 can be formed in a different (e.g., higher) layer of memory in a memory device than the memory array that includes the local access lines 446, memory cell access lines, the data cores 424, and the ECC cores 426. Since the global access lines 436 can be formed in a different layer of memory, the global access lines 436 can be made of a different material than the local access lines. For example, the global access lines 436 can be formed from a metal material and the memory cell access lines can be formed from a non-metal material or a different metal material than the global access line 436.

In some embodiments, the data cores 424 can store data corresponding to a first function and the ECC core 426 can store data corresponding to a second function. For example, the data cores 424 can store data corresponding to read and/or write operations and the ECC core 426 can store data corresponding to correcting errors in data. A first number of access line contacts 450 can be used to couple a memory cell access line corresponding to data in the data core 424 (e.g., an access line that will access memory cells in the data core 424) to a local access line 446 and a second number of access line contacts 450 can be used to couple a memory cell access line corresponding to the ECC core 426 (e.g., an access line that will access memory cells in the ECC core 426) to a local access line 446. In some embodiments, a quantity of the first number of access line contacts 446 can be less than a quantity of the second number of access line contacts 446. For example, as shown in FIG. 4, one access line contact 450-1 can be used to couple a memory cell access line corresponding to the data core 424-8 to the local access line 446-1 and two access line contacts 450-2, 450-3 can be used to couple a memory cell access line corresponding to the ECC core 426 to the local access line 446-1. In some embodiments, the access line contacts 450 can be buried access line contacts.

In some embodiments, a quantity of the number of access line contacts 450 used to couple a memory cell access line to a local access line 446 can be determined by an importance of a function corresponding to the data. A first function can have a first importance and a second function can have a second importance. For example, data cores 424 can store data corresponding to read and/or write operations of memory cells (e.g., a first function) and the ECC core 426 can store data corresponding to correcting errors in data (e.g., a second function). In some embodiments, the first importance can correspond to a lower level of importance than the second function. By corresponding to a lower level of importance than the data corresponding to a second function, decreasing the error rate of the data corresponding to a first function is considered less important to the memory cell functioning properly than decreasing the error rate of the data corresponding to the second function.

In some embodiments, the first importance can correspond to a lower number of access line contacts 450 than the second importance. For example, the data in the data core 424 can have a lower level of importance than the data in the ECC core 426; therefore, the number of access line contacts 450 used to couple a memory cell access line corresponding to the data in the data core 424 to the local access line 446 can be less than the number of access line contacts 450 used to couple a memory cell access line corresponding to data in the ECC core 426 to the local access line 446. Increasing the number of access line contacts 450 used to couple a memory cell access line to the local access line 446 can increase the reliability of data (e.g., decrease the error rate of data) corresponding to a memory cell access line coupled to the access line contacts 450. As used herein, the term "error rate of data" refers to a number of errors in data that occur over a specified length of time. Further, the first memory cell access line corresponding to the data the corresponds to a first function can be coupled to the SAD 448 via a first number of access line contacts 450 and a second memory cell access line corresponding to the data that corresponds to a second function can be coupled to the SAD 448 via a second number of access line contacts 450. In some embodiments, the SAD 448 can be a complementary metal oxide semiconductor (CMOS) SAD.

In the embodiment shown in FIG. 4, the access line contacts 450 included in the first number of access line contacts 450 can have a same size as the access line contacts 450 included in the second number of access line contacts 450. However, in other embodiments, a first portion of the local access line 446 (e.g., the portion of the local access line 446 between an SAD 448 and a data core 424) can include a first access line contact 450 having a first size and a second portion of the local access line 446 (e.g., the portion of the local access line 446 between an SAD 448 and the ECC core) can include a second access line contact 450 having a second size. The first size of the access line contact 450 can be determined by data corresponding to a first function of the data core 424 and the second size of the second access line contact 450 can be determined by data corresponding to a second function of the ECC core 426. In some embodiments, the first size of the first access line contact 450 can be less than the second size of the second access line contact 450. Increasing the second size of the second access line contact 450 can increase a reliability of data traveling through a memory cell access line coupled to the second access line contact 450.

Figure 5:
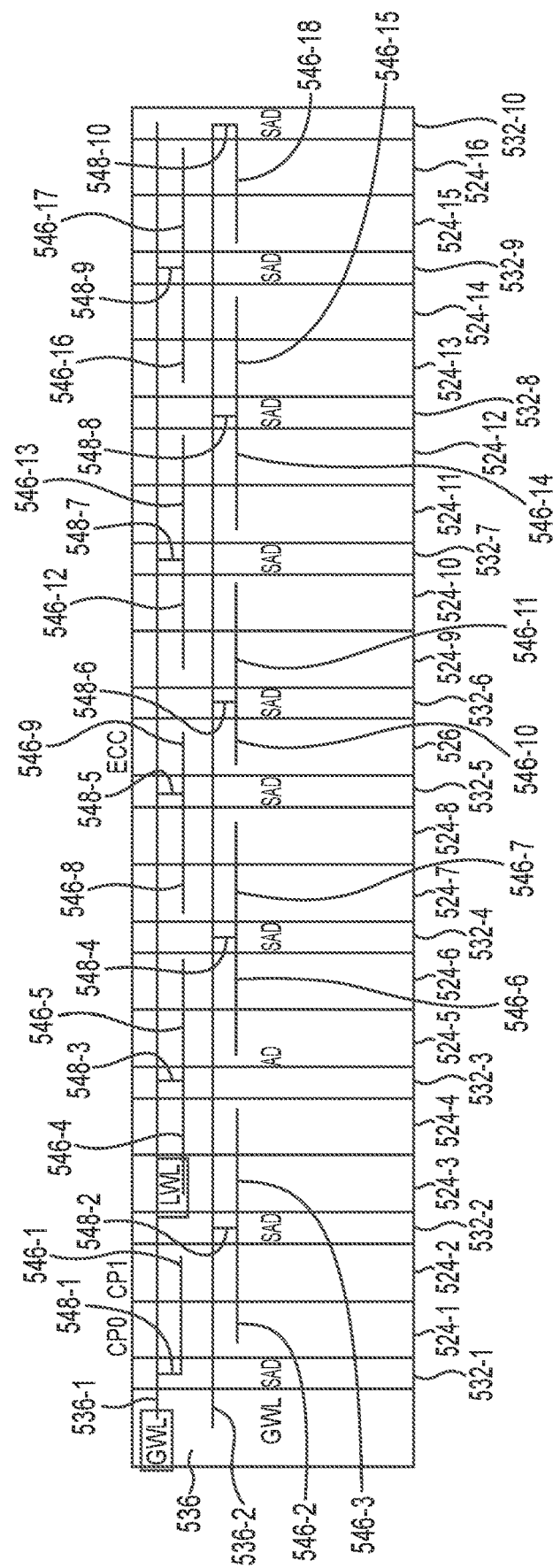
FIG. 5 is a diagram of a plurality of data planes in a memory array of a memory device in accordance with a number of embodiments of the present disclosure.

FIG. 5 is a diagram of a plurality of data planes in a memory array of a memory device in accordance with a number of embodiments of the present disclosure. FIG. 5 includes a global access line driver plane 535, global access lines 536-1, 536-2 (individually or collectively referred to as global access lines 536), SAD planes 532-1, 532-2, . . . , 532-10 (individually or collectively referred to as SAD planes 532), data cores 524-1, 524-2, . . . , 524-16 (individually or collectively referred to as data cores 524), an ECC plane 526, SADs 548-1, 548-2, . . . , 548-10 (individually or collectively referred to as connectors 548), and local access lines 546-1, 546-2, . . . , 546-18 (individually or collectively referred to as local access lines 546).

FIG. 5 is similar to FIG. 3. However, FIG. 5 further includes the global access lines 536, local access lines 546, and SADs 548. The global access lines 536 can drive current to the SADs 548. The SADs 548 can then drive that current through the local access lines 546 and the local access lines 546 can drive the current through memory cell access lines (not pictured) coupled to the local access lines 546 via access line contacts (e.g., access line contacts 450 in FIG. 4). In some embodiments, the SADs 548 can be used to overcome the capacitive load of the corresponding memory cell access lines (not shown in FIG. 5). As used herein, the term "capacitive load" refers to an unintended capacitance of a memory component due to being within a certain distance of another memory component. Without the SADs 548, the capacitive load of the memory cell access lines would be too high to drive the current through. Therefore, the SADs 548 allows the global access lines 536 to drive current through the local access lines 546 and the memory cell access lines.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense.

As used herein, "a number of" or a "quantity of" something can refer to one or more of such things. For example, a number of or a quantity of memory cells can refer to one or more memory cells. A "plurality" of something intends two or more. As used herein, multiple acts being performed concurrently refers to acts overlapping, at least in part, over a particular time period. As used herein, the term "coupled" may include electrically coupled, directly coupled, and/or directly connected with no intervening elements (e.g., by direct physical contact), indirectly coupled and/or connected with intervening elements, or wirelessly coupled. The term coupled may further include two or more elements that cooperate or interact with each other (e.g., as in a cause and effect relationship). An element coupled between two elements can be between the two elements and coupled to each of the two elements.

It should be recognized the term vertical accounts for variations from "exactly" vertical due to routine manufacturing, measuring, and/or assembly variations and that one of ordinary skill in the art would know what is meant by the term "perpendicular." For example, the vertical can correspond to the z-direction. As used herein, when a particular element is "adjacent to" another element, the particular element can cover the other element, can be over the other element or lateral to the other element and/or can be in direct physical contact with the other element. Lateral to may refer to the horizontal direction (e.g., the y-direction or the x-direction) that may be perpendicular to the z-direction, for example.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

What is claimed is:

1. An apparatus, comprising:
   an array of memory cells, including:
   a first data plane;
   a local access line coupled to the first data plane;
   a second data plane coupled to the local access line; and
   a sub-access line driver (SAD) coupled to the local access line, wherein:
   a first portion of the local access line between the SAD and the first data plane includes a first number of access line contacts;
   a second portion of the local access line between the SAD and the second data plane includes a second number of access line contacts; and
   the first number of access line contacts are determined by data corresponding to a first function of the first data plane and the second number of access line contacts are determined by data corresponding to a second function of the second data plane.

2. The apparatus of claim 1, wherein the first data plane is a column plane.

3. The apparatus of claim 1, wherein the second data plane is an error correction code (ECC) plane.

4. The apparatus of claim 1, wherein the first number of access line contacts is less than the second number of access line contacts.

5. The apparatus of claim 1, wherein the access line contacts included in the first number of access line contacts have a same size as the access line contacts included in the second number of access line contacts.

6. The apparatus of claim 1, wherein the first portion of the local access line includes a first access line contact having a first size and the second portion of the local access line includes a second access line contact having a second size.

7. The apparatus of claim 6, wherein the first size of the first access line contact is less than the second size of the second access line contact.

8. A system, comprising:
   a host; and
   a memory device coupled to the host, wherein the memory device includes an array of memory cells that include:
   an error correction code (ECC) plane coupled to a first column plane via a first local access line;
   a second column plane coupled to the ECC plane via a second local access line;
   a first sub-access line driver (SAD) coupled to the first local access line;
   a second SAD coupled to the second local access line;
   a first number of access line contacts on a first portion of the first local access line between the first column plane and the first SAD;
   a second number of access line contacts on a second portion of the first local access line between the first SAD and the ECC plane;
   the first number of access line contacts on a first portion of the second local access line between the column data plane and the second SAD; and the second number of access line contacts on a second portion of the second local access line between the second SAD and the ECC plane, wherein the first number of access line contacts is determined by data corresponding to a first function of the first column plane and the second column plane, and the second number of access line contacts is determined by data corresponding to a second function of the ECC plane.

9. The system of claim 8, wherein the first function has a first importance and the second function has a second importance.

10. The system of claim 9, wherein the first importance corresponds to a lower level of importance than the second importance.

11. The system of claim 10, wherein the first importance corresponds to a lower number of access line contacts than the second importance.

12. The system of claim 11, wherein increasing the number of access line contacts increases a reliability of data of an access line coupled to the access line contacts.

13. The system of claim 11, wherein increasing the number of access line contacts decreases an error rate of the data of an access line coupled to the access line contacts.

14. The system of claim 8, wherein a first access line corresponding to the data corresponding to the first function is coupled to the first SAD via the first number of access line contacts.

15. The system of claim 8, wherein a second access line corresponding to the data corresponding to the second function is coupled to the second SAD via the second number of access line contacts.

16. An apparatus, comprising:
an array of memory cells, including:
 a data core;
 a local access line coupled to the data core;
 an error correction code (ECC) core coupled to the local access line; and
 a sub-access line driver (SAD) coupled to the local access line, wherein:
  a first portion of the local access line between the SAD and the data core includes a first access line contact, wherein the first access line contact has a first size;
  a second portion of the local access line between the SAD and the ECC core includes a second access line contact, wherein the second access line contact has a second size; and
  the first size of the first access line contact is determined by data corresponding to a first function of the data core and the second size of the second access line contact is determined by data corresponding to a second function of the ECC core.

17. The apparatus of claim 16, wherein increasing the second size of the second access line contact increases a reliability of data travelling through an access line coupled to the second access line contact.

18. The apparatus of claim 16, wherein increasing the size of the second access line contact decreases an error rate of data travelling through an access line coupled to the second access line contact.

19. The apparatus of claim 16, wherein the first access line contact and the second access line contact are buried access line contacts.

20. The apparatus of claim 16, wherein the SAD is a complementary metal oxide semiconductor (CMOS) SAD.

* * * * *